US012669057B2

(12) United States Patent
Fleischer

(10) Patent No.: US 12,669,057 B2
(45) Date of Patent: Jun. 30, 2026

(54) ROTOR ARRANGEMENT FOR A LOW-PRESSURE TURBINE OF A TURBOMACHINE

(71) Applicant: MTU Aero Engines AG, Munich (DE)

(72) Inventor: Ilse Fleischer, Dachau (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/615,352

(22) Filed: Mar. 25, 2024

(65) Prior Publication Data

US 2024/0328319 A1 Oct. 3, 2024

(30) Foreign Application Priority Data

Mar. 30, 2023 (DE) ..................... 10 2023 108 251.5

(51) Int. Cl.
*F01D 5/02* (2006.01)
*F01D 5/06* (2006.01)
*F01D 25/16* (2006.01)

(52) U.S. Cl.
CPC ............. *F01D 5/025* (2013.01); *F01D 5/066* (2013.01); *F01D 25/162* (2013.01); *F01D 5/026* (2013.01); *F05D 2220/323* (2013.01); *F05D 2240/54* (2013.01)

(58) Field of Classification Search
CPC . F01D 5/025; F01D 5/06; F01D 5/066; F01D 5/026; F01D 25/162
See application file for complete search history.

(56) References Cited

U.S. PATENT DOCUMENTS 8,388,303 B2 * 3/2013 Weidmann .............. F01D 5/082 416/174
8,844,265 B2 * 9/2014 Adams ...................... F02K 3/06 60/226.3
8,850,793 B2 * 10/2014 Adams ...................... F02C 3/04 60/226.3
8,887,487 B2 * 11/2014 Kupratis ................... F02C 7/36 60/226.3
9,010,085 B2 * 4/2015 Adams ...................... F02C 7/36 60/226.3
9,932,858 B2 * 4/2018 Miller ................... F01D 25/164
10,030,586 B2 * 7/2018 Kupratis ................... F02C 7/36
10,190,496 B2 * 1/2019 Schwarz ............... F04D 29/321
10,294,821 B2 5/2019 Moniz et al.
10,662,880 B2 * 5/2020 Adams ...................... F02C 7/36
10,794,292 B2 * 10/2020 Kupratis ................. F02K 3/072
10,830,131 B2 * 11/2020 Schwarz .................... F02C 7/06
10,837,284 B2 * 11/2020 Siebel ..................... F01D 5/066
(Continued)

FOREIGN PATENT DOCUMENTS

DE 102007023380 A1 11/2008
DE 102016219818 A1 4/2018
DE 102008048006 B4 2/2019

*Primary Examiner* — Courtney D Heinle
*Assistant Examiner* — Behnoush Haghighian
(74) *Attorney, Agent, or Firm* — Hinckley, Allen & Snyder, LLP; David R. Josephs

(57) ABSTRACT

The invention relates to a rotor arrangement for a low-pressure turbine of a turbomachine with end-side linkage to a shaft of the turbomachine, comprising a plurality of rotating stages, which are arranged in a flow direction and are connected to one another, wherein the last rotating stage in the flow direction can be linked to the shaft by a rotor disk.

13 Claims, 2 Drawing Sheets

(56) References Cited

U.S. PATENT DOCUMENTS

Figure 1:
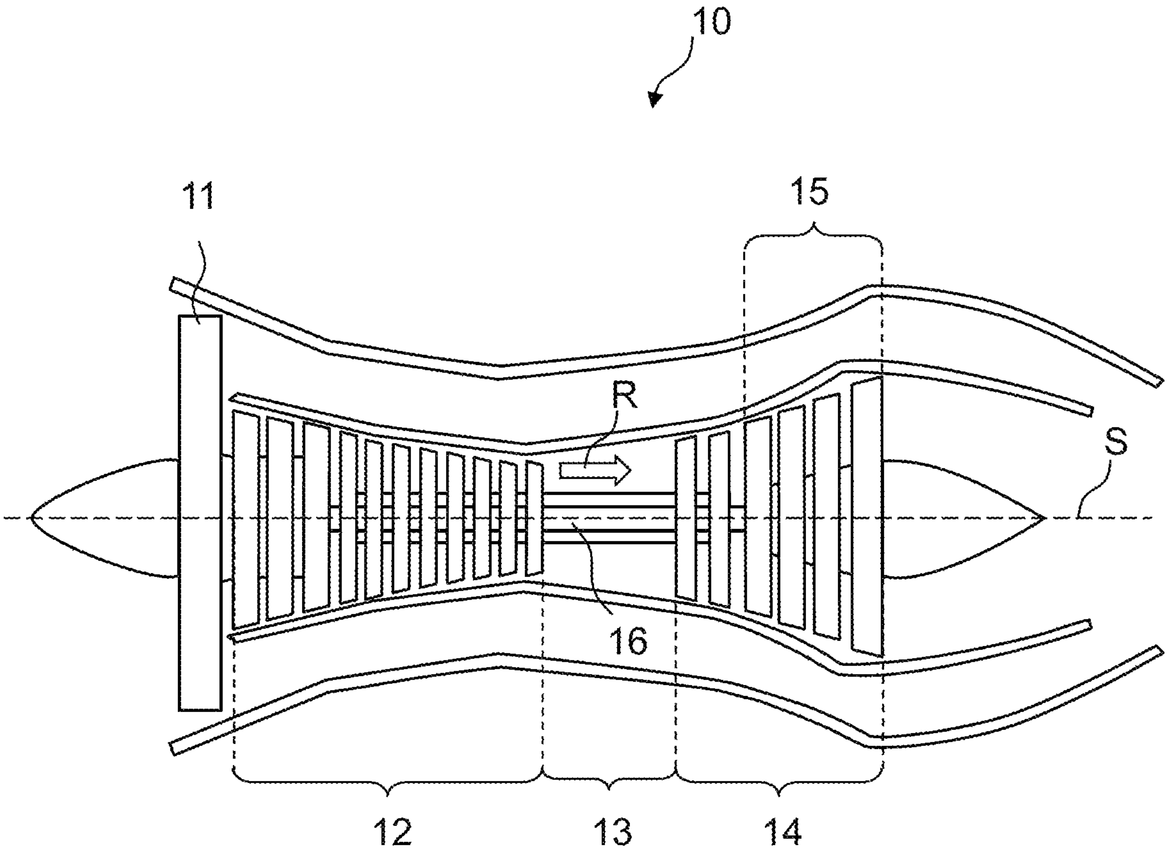

| | | | | |
|---|---|---|---|---|
| 11,549,373 | B2 * | 1/2023 | McCaffrey | F01D 5/025 |
| 11,724,813 | B2 * | 8/2023 | Payyoor | F02C 7/36<br>244/54 |
| 2006/0130456 | A1 | 6/2006 | Suciu et al. | |
| 2010/0104418 | A1 * | 4/2010 | Weidmann | F01D 25/125<br>415/111 |
| 2012/0291449 | A1 * | 11/2012 | Adams | F02K 3/06<br>60/793 |
| 2014/0102076 | A1 * | 4/2014 | Adams | F02K 3/06<br>60/226.3 |
| 2015/0143794 | A1 | 5/2015 | Schwarz et al. | |
| 2016/0025003 | A1 * | 1/2016 | Schwarz | F02K 3/06<br>415/69 |
| 2017/0030220 | A1 * | 2/2017 | Miller | F01D 25/18 |
| 2019/0048723 | A1 * | 2/2019 | Siebel | F01D 5/066 |
| 2019/0128182 | A1 * | 5/2019 | Schwarz | F02K 3/06 |
| 2020/0263547 | A1 | 8/2020 | Stuart et al. | |

* cited by examiner

ROTOR ARRANGEMENT FOR A LOW-PRESSURE TURBINE OF A TURBOMACHINE

BACKGROUND OF THE INVENTION

The invention relates to a rotor arrangement for a low-pressure turbine of a turbomachine with end-side linkage to a shaft of the turbomachine, comprising a plurality of rotating stages that are arranged in a flow direction and connected to one another. In addition, the invention relates to a low-pressure turbine and a turbomachine having such a rotor arrangement.

Efforts are being made for aircraft engines to consume less fuel, to emit fewer emissions, and, in addition, to be quieter. In order to fulfill these demands in enhanced efficiency, turbomachines for aircraft engines are designed with high propulsion efficiency and compact constructions. Typically, the turbomachine has a turbine region with a rotating blade system, which comprises rotor disks connected to a shaft of the turbomachine, each of which carries a plurality of rotating blades. On its part, the shaft serves, in particular, for driving a compressor system of the turbomachine.

On account of the required total pressure ratio and the high gas inlet temperatures, the turbine region is subject to heavy loads. Speeds of rotation arising during operation in this case produce high static and dynamic loads both for the rotor disks and for the rotating blades. In turbines, the mechanical and thermal loads are met by a smaller number of rotor disks or stages and a reduced construction length, as a result of which the number of components can be reduced and a lower weight can be attained.

SUMMARY OF THE INVENTION

Based on this, an object of the present invention is to propose an improved rotor arrangement for a low-pressure turbine of a turbomachine. Furthermore, an improved low-pressure turbine and also a turbomachine are to be provided. This is accomplished in accordance with the present invention. Advantageous embodiments of the invention are discussed in detail herein.

Proposed for achieving the object is a rotor arrangement for a low-pressure turbine of a turbomachine with end-side linkage to a shaft of the turbomachine. The rotor arrangement has a plurality of rotating stages that are arranged in a flow direction and connected to one another, wherein the rotor arrangement in the flow direction can be linked to the shaft by a rotor disk at the last rotating stage. The rotor disk is thereby designed as a conical disk that expands radially in the flow direction.

In this case, the rotor disk in the form of a conical disk serves as a rotatable mounting of rotating stages of the rotor arrangement that are connected to one another in a rotationally rigid manner on the shaft of the turbomachine. The geometry of the rotor disk, formed as a conical disk, thereby influences the behavior of the entire rotor, both the radial displacements and the axial displacements, which have a direct effect on the efficiency of the low-pressure turbine. Through the formation of the rotor disk as a conical disk that expands radially in the flow direction, it is possible to stabilize radial and/or axial displacements, in particular those of the regions of the rotor arrangement that are linked via the conical disk, as a result of which an enhancement in efficiency can be made possible for the low-pressure turbine. In addition, in the case of an end-side linkage, the mechanical stability of the rotor arrangement can be improved.

In accordance with further aspects, a low-pressure turbine for an aircraft engine, in particular a four-stage low-pressure turbine, comprising a rotor arrangement described herein is proposed as well as a turbomachine for an aircraft engine that has such a low-pressure turbine and/or rotor arrangement. The effects and advantages that are achievable by the herein described embodiments of the proposed rotor arrangement are equally applicable to the proposed low-pressure turbine or turbomachine. In particular, by the proposed rotor arrangement, a weight-optimized and/or compact construction for the low-pressure turbine or turbomachine is/are made possible.

Typically, a turbomachine for a flight propulsion drive has at least one compressor, in particular a low-pressure compressor and a high-pressure compressor, a combustion chamber, and at least one turbine, in particular a high-pressure turbine and a low-pressure turbine. In this case, the low-pressure turbine has, in particular, a plurality of stages, which are positioned axially one behind the other in the throughflow direction. Each stage is formed here from a stationary or static guide vane arrangement or guide vane stage as well as a rotatable rotating blade arrangement or rotating blade stage, whereby a stationary guide vane stage has a plurality of radially arranged guide vanes and a rotatable rotating stage has a plurality of radially arranged rotating blades. The rotating stages thereby form the rotor arrangement.

Usually, each rotating stage has a respective rotor disk at which the rotating blades are arranged circumferentially as well as, respectively, at least one flange, which serves for the connection to a further rotor disk. It is thereby possible for sealing devices to be arranged between the rotating stages and to be designed, for example, as part of a labyrinth or brush seal.

The rotating blades are arranged, in particular, concentrically along a circular line around a central axis of the rotating stage or of the turbomachine axis. The rotating blades can thereby also be formed integrally with the rotor disk or else they can be fixed to the rotor disk via a blade root as separately produced rotating blades. The rotor disks arranged upstream of the last rotating stage are designed, in particular, in the form of an annular segment or a disk segment.

The invention is based on, among other things, the idea of forming the rotor disk of the last rotating stage for the end-side connection of the rotor arrangement to the shaft as, in particular, a uniformly radially expanding conical disk. In this case, the conical disk has essentially a geometry or base structure like a hollow (truncated) cone, in which two circular rings, arranged axially spaced apart and concentric with respect to the axis of rotation, are connected to each other through a wall that is essentially comparable to a wall formed with a conical lateral surface. In axial section, the conical lateral surface has here, in particular, an essentially rectilinear course. The circular ring situated downstream thereby has a greater diameter than the circular ring situated upstream. Consequently, the conical disk expands in the flow direction of the turbomachine. In this case, the expansion occurs uniformly, in particular, but it can also have, in particular, a stepped or curved form in sections. The geometry of the conical disk is further determined by the axial distance between the circular surfaces and thus by the height of the (truncated) cone as well as by the wall thickness.

At its radial inner circumference and thus upstream, the rotor disk has a shaft linkage region, by which it is linked or can be linked to the shaft. Owing to the radially expanding form in the flow direction, the shaft-side linkage of the last rotating stage or of a downstream-most hub occurs within an axial extension of the rotor arrangement, whereby both radial displacements and axial displacements of the rotor arrangement can be kept within suitable limits in the proposed end-side linkage.

In an embodiment of the rotor arrangement, the rotor disk, formed as a conical disk, is linked to the shaft in the axial direction between a first rotating stage and the last rotating stage. This makes possible an especially short and/or compact construction of the rotor arrangement and thereby of the low-pressure turbine. It is possible here for the rotor disk to be connected to the shaft or mounted on the shaft, in particular, at a shaft linkage region. The shaft linkage region is thereby formed, in particular, in a way that is suitable for producing a connection to the shaft. The shaft linkage region is thus formed, in particular at least in sections, to surround the shaft and/or to be parallel to the axis of the shaft, in particular in order to make possible a force-fitting and/or form-fitting, in particular flat, connection of the shaft linkage region or of the rotor disk and thus of the rotor arrangement to the shaft, as a result of which a flow of force can be produced between the rotor arrangement and the shaft.

In an embodiment of the rotor arrangement, the rotor disk, formed as a conical disk, has a wall between a radially inner shaft linkage region and a radially outer hub region that is essentially formed similarly to a conical lateral surface. The hub region is thus formed, in particular, as a structure that is designed to be continuously surrounding in the circumferential direction and is reinforced, which serves for the stabilization of the rotor arrangement, in particular, with respect to loads due to the speed of rotation. This hub region is arranged, in particular, at a radial spacing inward from the rotating blades in a radially outer region of the wall of the rotor disk. Owing to the conical disk shape formed by the wall, it is possible to achieve a rigidity of the rotor disk, which can withstand loads arising during operation of the rotor arrangement.

In an embodiment of the rotor arrangement, the wall of the rotor disk, formed as a conical disk, has at least one tapering and afterwards a widening of the wall thickness between the shaft linkage region and the hub region, so that the wall is tapered in shape. It is possible here for the wall between the end of the tapering and the beginning of the widening to have a reduced wall thickness in relation to the wall in the vicinity of or at the shaft linkage region and/or in the vicinity of or at the hub region. In this way, it is possible to attain a geometry or mass distribution for the rotor disk that satisfies the operation-related loads in the regions of the rotor disk that, in particular, are crucial for such loads, whereby, at the same time, it is possible to reduce the mass in other regions, as a result of which a reduction in weight can be achieved. The specially tapered geometry of the wall of the rotor disk, formed as a conical disk, makes possible, on account of its special design, an acceptable displacement for an end-side linkage and thus without any counterbalance beyond the linkage site.

In an embodiment of the rotor arrangement, the tapering and the subsequent widening of the thickness of the wall extend from the hub region to the shaft linkage region or from the shaft linkage region to the hub region. In this case, the wall can have, in an axial section, a one-sided or two-sided concave inner and/or outer shape or else diverge in the direction of the shaft linkage region and/or hub region. In this way, the wall thickness can turn out to be reduced at least in sections, whereby weight can be saved, but, at the same time, the rotor disk can withstand loads arising during operation.

In an embodiment of the rotor arrangement, the wall encloses an angle in the range of 40° to 60°, in particular in the range of 44° to 56°, with the axis of rotation of the shaft and thus, in particular, also with the axis of the turbomachine. In particular, the wall encloses with the axis of rotation of the shaft an angle of 40°, 41°, 42°, 43°, 44°, 45°, 46°, 47°, 48°, 49°, 50°, 51°, 52°, 53°, 54°, 55°, 56°, 57°, 58°, 59°, or 60°, whereby the exact angle can obviously also have a value between two specified angles. In this way, it is possible to shape, in particular, a radial extension of the wall in such a way that a mechanically stable and self-supporting structure of the rotor arrangement is also afforded at high speeds of rotation.

In an embodiment of the rotor arrangement, the rotor disk at the shaft linkage region has at least one fillet radius. Such a surrounding fillet radius, in particular in the circumferential direction, is also referred to as a rounding radius. The shaft linkage region can hereby have, in an axial section, essentially the geometry of a triangle having two concave sides, with one side facing the shaft, whereby the side can be axis-parallel and straight in form. Through a connection by one fillet radius, it is possible to reduce a concentration of stress in the shaft linkage region due to mechanical load.

In an embodiment of the rotor arrangement, a bearing of the rotor or of the shaft is arranged radially within a second rotating stage of the rotor arrangement. By way of the proposed design of the end-side rotor disk, the bearing can be arranged upstream of the disk linkage and nonetheless close to the downstream end of the shaft. In this way, it is possible for the shaft, given a relatively small length, to be mounted nonetheless close to the downstream end of the shaft. This makes possible an especially advantageous compromise between a small shaft length or a small weight and a stable mounting of the shaft.

In an embodiment of the rotor arrangement, the axial distance between the first rotating stage and the last rotating stage is 18 cm to 28 cm, in particular 21 cm to 25 cm. In particular, the distance between the first rotating stage and the last rotating stage is 18 cm, 19 cm, 20 cm, 21 cm, 22 cm, 23 cm, 24 cm, 25 cm, 26 cm, 27 cm, or 28 cm, whereby the exact distance can obviously be a value between two specified distances. Resulting from this is a length-reduced design of the rotor arrangement and thus also of the low-pressure turbine.

In an embodiment of the rotor arrangement, a radial distance between the turbomachine axis and an outer diameter of a first rotor disk of the first rotating stage is 19 cm to 32 cm. In particular, the radial distance between the turbomachine axis and the outer diameter of the first rotor disk of the first rotating stage is 19 cm, 20 cm, 21 cm, 22 cm, 23 cm, 24 cm, 25 cm, 26 cm, 27 cm, 28 cm, 29 cm, 30 cm, 31 cm, or 32 cm, whereby the exact distance obviously can be a value between two of specified distances. This design further makes possible a optimization of the low-pressure turbine in terms of weight.

In an embodiment of the rotor arrangement, a ratio of the axial distance between the first rotating stage and the last rotating stage and the radial distance of the turbomachine axis to the outer diameter of the first rotor disk is 0.8 to 1.6; in particular, this ratio is 0.95 to 1.45. This makes possible a compact embodiment of the rotor arrangement. In particular, the ratio of the axial distance between the first rotating stage and the last rotating stage and the radial distance of the turbomachine axis to the outer diameter of the first rotor disk is 0.8, 0.85, 0.9, 0.95, 1, 1.05, 1.1, 1.15, 1.2, 1.25, 1.3, 1.35, 1.4, 1.45, 1.5, 1.55, or 1.6, whereby the exact value of the ratios obviously also can lie between two specified ratios.

In an embodiment of the rotor arrangement, a ratio of the axial distance between the first rotating stage and the last rotating stage and an axial distance between the bearing of the rotor, in particular the middle bearing of the rotor, and the last rotating stage is 1.0 to 2.4 and, in particular, 1.2 to 1.7. In particular, the ratio of the axial distance between the first rotating stage and the last rotating stage and the axial distance between the bearing of the rotor and the last rotating stage is 1.0, 1.1, 1.2, 1.3, 1.4, 1.5, 1.6, 1.7, 1.8, 1.9, 2.0, 2.1, 2.2, 2.3, or 2.4. The exact value of the ratio obviously also can lie between two of the specified ratios. The proposed design further makes possible an improved mechanical stability of the rotor arrangement.

In an embodiment of the rotor arrangement, a ratio of the axial distance between the first rotating stage and the last rotating stage and a linkage distance between the bearing of the rotor or of the shaft and the shaft linkage region is 2.5 to 3.5, in particular 2.7 to 3.3. In particular, the ratio of the axial distance between the first rotating stage and the last rotating stage and the linkage distance between the bearing of the rotor and the shaft linkage region is 2.5, 2.6, 2.7, 2.8, 2.9, 3.0, 3.1, 3.2, 3.3, 3.4, or 3.5, whereby the exact value of the ratio can obviously also lie between two of the specified ratios. This further development also contributes to the improvement of the load capability of the rotor arrangement.

Further features, advantages, and possible applications of the invention ensue from the following description in conjunction with the figures. In general, it holds that features of the various exemplary aspects and/or embodiments described herein can be combined with one another insofar as this is not explicitly excluded in connection with the disclosure.

BRIEF DESCRIPTION OF THE DRAWING FIGURES

Figure 2:
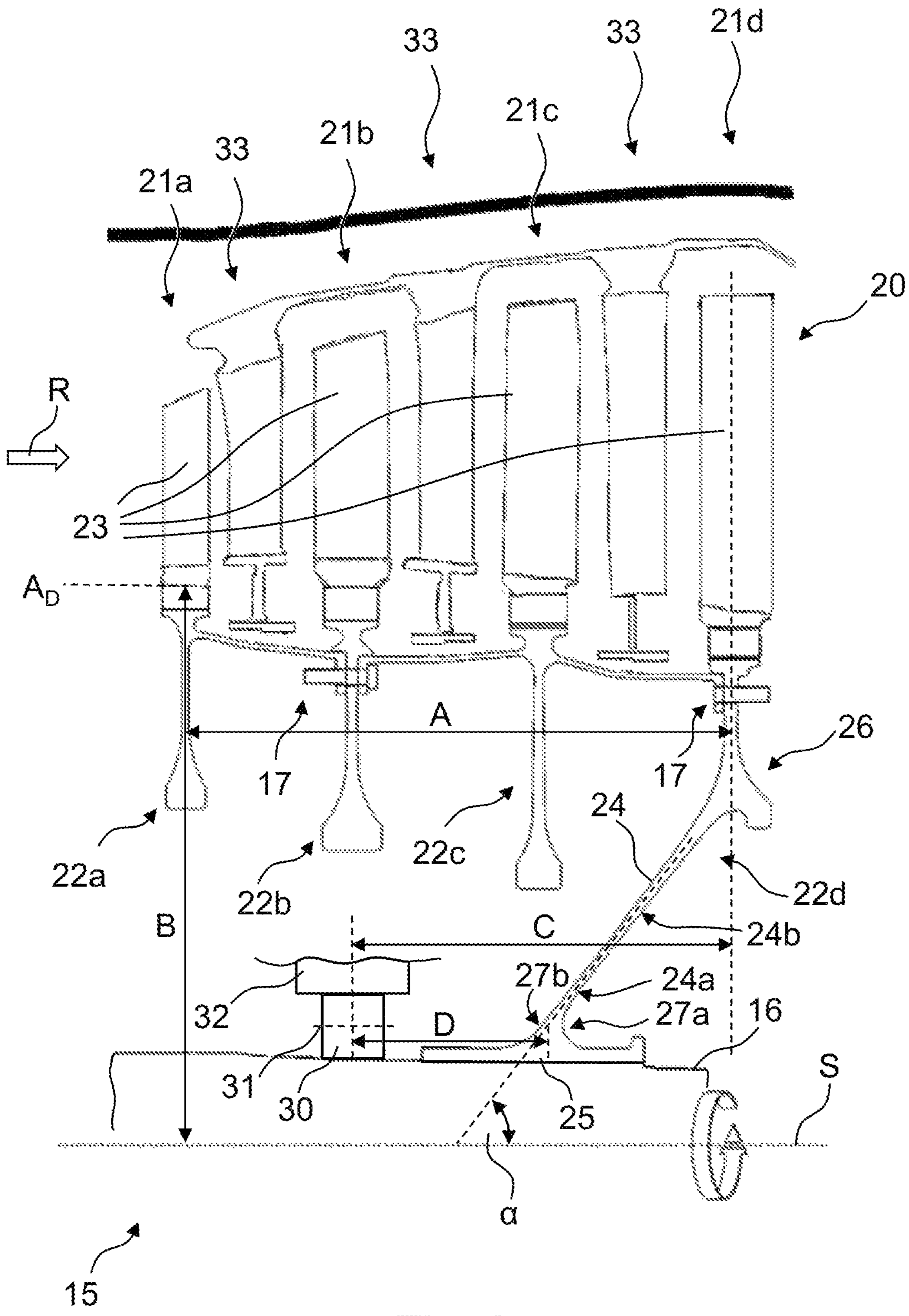

In the following part of the description, reference is made to the figures, which are shown for highlighting specific aspects and embodiments of the present invention. It is obvious that other aspects can be used and that structural or logical changes in the illustrated embodiments are possible without leaving the scope of the present invention. The following description of the figures is therefore to be understood as non-limitative. Herein:

FIG. 1 shows a schematic illustration of an exemplary embodiment of a turbomachine, in particular for an aircraft engine, in accordance with the present disclosure; and FIG. 2 shows a schematic illustration of an excerpt of an exemplary embodiment of a rotor arrangement for a low-pressure turbine of a turbomachine with end-side linkage to a shaft of the turbomachine in accordance with the present disclosure.

DESCRIPTION OF THE INVENTION

FIG. 1 shows, by way of example, an illustration of an exemplary embodiment of a turbomachine 10 for an aircraft engine in a schematic sectional view along the turbomachine axis S.

Arranged one after the other in the flow direction R, the turbomachine 10 has a fan 11, a compressor 12, a combustion chamber 13, and a turbine 14 with a low-pressure turbine 15, through which a gas flow can stream in the flow direction R or through which the gas flow streams during operation of the turbomachine 10. The low-pressure turbine 15 can hereby be connected via a shaft 16 to the compressor 12 and/or to the fan 11 in order to drive them, in particular via gearing. A flight propulsion drive or an aircraft engine can have such a turbomachine 10.

FIG. 2 shows a schematic illustration of an excerpt of an exemplary embodiment of a low-pressure turbine 15 for a turbomachine 10 for an aircraft engine with a rotor arrangement 20 according to the invention.

Shown in FIG. 2, by way of example, are four rotating stages 21*a* to 21*d* of the rotor arrangement 20, which are arranged one after the other along a turbomachine axis S. The illustrated excerpt thus shows only a part above the turbomachine axis S in the region of the low-pressure turbine 15. The individual rotating stages 21*a* to 21*d* are connected here to one another via flange connections 17 in a rotationally rigid manner.

The rotating stages 21*a* to 21*d* each have a rotor disk 22*a* to 22*d*, at which the respective rotating blades 23 of a row of blades or rotating blade arrangement are arranged, in particular, concentrically along a circular line around a central axis of the rotating stage 21 or of the turbomachine axis S and are fixed in place on the respective rotor disk 22 via a blade root of a rotating blade 23. The front three rotating stages 21*a*, 21*b*, 21*c* in the flow direction R are formed here essentially in a ring-shaped or disk-shaped manner.

In the axial direction, the rotatable rotating stages 21 alternate with the stationary guide stages 33. The last rotating stage 21*d* of the rotor arrangement 20 in the flow direction R can be linked to or is linked to a shaft 16 of the turbomachine 10 by a rotor disk formed as a conical disk 22*d*. This rotor disk 22*d* is thus formed as a conical disk that expands radially in the flow direction R and is linked to the shaft 16 in the axial direction between the first rotating stage 21*a* and the last rotating stage 21*d* radially within the rotor arrangement 20.

In the illustrated exemplary embodiment, between a shaft linkage region 25 and a hub region 26 of the rotor disk 22*d*, there extends a wall 24, the lateral surface of which is conically formed, of the rotor disk 22*d*. Between the shaft linkage region 25 and the hub region 26, the wall 24 thus has a tapering 24*a* and afterwards a widening 24*b* of the wall thickness. In each instance, the wall 24 diverges here in a region facing the shaft linkage region 25 and the hub region 26, whereby the shaft linkage region 25 has fillet radii 27*a*, 27*b* in a transition region to the wall. In this case, the wall 24 encloses an angle α in the range of 40° to 60°—in the illustrated embodiment, approximately 53°—with the shaft 16.

An axial distance A between the first rotating stage 21*a* and the last rotating stage 21*d* is 18 cm to 28 cm and a radial distance B between the turbomachine axis S and an outer diameter $A_D$ of the first rotor disk 22*a* of the first rotating stage 21*a* can be 19 cm to 32 cm.

The rotor arrangement is designed in such a way that a ratio of the axial distance A and the radial distance B is 0.8 to 1.6 and/or a ratio of the axial distance A and an axial distance C between the bearing of the rotor and the last rotating stage 21*d* is 1.0 to 2.4. A ratio of the axial distance A and a linkage distance D between the bearing of the rotor and the shaft linkage region 25 is 2.5 to 3.5. Illustrated in FIG. 2, by way of example, is a bearing roller of the bearing 30 with an axis of rotation 31, by which a linkage 32 of the shaft 16 to a stator of the turbomachine 10 is provided.

A rotor arrangement 20 designed in accordance with one or a plurality of the proposed aspects can reduce a construction length of the rotor arrangement 20 or of the low-pressure turbine 15 and thus of the turbomachine 10 and can better absorb mechanical and thermal loads. Beyond this, a reduced number of components and/or a diminished weight of the low-pressure turbine is or are achieved.

What is claimed is:

1. A rotor arrangement for a low-pressure turbine of a turbomachine with end-side linkage to a shaft of the turbomachine, comprising:

a plurality of rotating stages, which are arranged in a flow direction and are connected to one another, wherein the rotor arrangement is linked to the shaft in the flow direction at a last rotating stage of the plurality of rotating stages by a rotor disk, wherein the rotor disk is configured and arranged as a conical disk that expands radially outward along an axial length from upstream to downstream; the rotor disk having a wall between a radially inner shaft linkage region and a radially outer hub region; the wall having a thinnest region; the wall having only one widening of the wall thickness from the thinnest region of the wall to the shaft linkage region and only one widening of the wall thickness extending from the thinnest region of the wall to the hub region.

2. The rotor arrangement according to claim 1, wherein the rotor disk, formed as a conical disk, is linked to the shaft in the axial direction between a first rotating stage and the last rotating stage.

3. The rotor arrangement according to claim 1, wherein the wall encloses an angle with the axis of rotation of the shaft in the range of 44° to 56°.

4. The rotor arrangement according to claim 1, wherein the rotor disk, formed as a conical disk, has at least one fillet radius at the shaft linkage region.

5. The rotor arrangement according to claim 1, wherein a bearing of the rotor is arranged radially within a second rotating stage of the rotor arrangement.

6. The rotor arrangement according to claim 1, wherein an axial distance between the first rotating stage and the last rotating stage is 21 cm to 25 cm.

7. The rotor arrangement according to claim 1, wherein a radial distance between a turbomachine axis and an outer diameter of a first rotor disk of the first rotating stage is 19 cm to 32 cm.

8. The rotor arrangement according to claim 1, wherein a ratio of the axial distance between the first rotating stage and the last rotating stage and the radial distance of the turbomachine axis to the outer diameter of the first rotor disk is 0.95 to 1.45.

9. The rotor arrangement according to claim 1, wherein a ratio of the axial distance between the first rotating stage and the last rotating stage and an axial distance between the bearing of the rotor and the last rotating stage is 1.2 to 1.7.

10. The rotor arrangement according to claim 1, wherein a ratio of the axial distance between the first rotating stage and the last rotating stage and a linkage distance between the bearing of the rotor and the shaft linkage region is 2.7 to 3.3.

11. A low-pressure turbine for an aircraft engine turbomachine, with a four-stage low-pressure turbine, comprising a rotor arrangement formed according to claim 1.

12. An aircraft engine turbomachine, comprising a rotor arrangement formed according to claim 1.

13. An aircraft engine turbomachine, comprising a low-pressure turbine formed according to claim 11.

* * * * *